(12) United States Patent
Richards

(10) Patent No.: US 9,796,272 B2
(45) Date of Patent: Oct. 24, 2017

(54) ROAD BEARING FOR ELECTRIC VEHICLE CONNECTION

(71) Applicant: Bryan Richards, Mill Creek, WA (US)

(72) Inventor: Bryan Richards, Mill Creek, WA (US)

( * ) Notice: Subject to any disclaimer, the term of this patent is extended or adjusted under 35 U.S.C. 154(b) by 449 days.

(21) Appl. No.: 14/467,948

(22) Filed: Aug. 25, 2014

(65) Prior Publication Data

US 2016/0052398 A1 Feb. 25, 2016

(51) Int. Cl.
| | |
|---|---|
| *B60L 5/00* | (2006.01) |
| *B60L 5/40* | (2006.01) |
| *B60M 1/34* | (2006.01) |
| *B60M 7/00* | (2006.01) |
| *B60L 11/18* | (2006.01) |

(52) U.S. Cl.
CPC .............. *B60L 5/005* (2013.01); *B60L 5/40* (2013.01); *B60L 11/182* (2013.01); *B60L 11/1824* (2013.01); *B60L 11/1831* (2013.01); *B60M 1/34* (2013.01); *B60M 7/003* (2013.01)

(58) Field of Classification Search
CPC ......... B60L 5/005; B60L 11/182; B60M 7/00; B60M 7/003; E01C 5/16
USPC .......................................................... 191/10
See application file for complete search history.

(56) References Cited

U.S. PATENT DOCUMENTS

| | | | | |
|---|---|---|---|---|
| 217,085 | A * | 7/1879 | Field ....................... | E01B 31/18 238/148 |
| 1,076,017 | A * | 10/1913 | Chase ...................... | E04C 2/427 29/897.15 |
| 1,089,613 | A * | 3/1914 | Wixom ..................... | E01C 5/16 404/21 |
| 2,026,224 | A * | 12/1935 | Drehmann ................ | E01C 5/16 404/21 |
| 2,118,577 | A * | 5/1938 | Thevenin .................. | E01C 5/16 156/324.4 |
| 2,230,506 | A * | 2/1941 | Vissering .................. | E01C 5/16 404/21 |
| 3,794,433 | A * | 2/1974 | Schupack ................. | E01D 2/04 14/73 |
| 4,139,071 | A | 2/1979 | Tacket | |

(Continued)

FOREIGN PATENT DOCUMENTS

WO      2013091875      6/2013

*Primary Examiner* — Zachary Kuhfuss
(74) *Attorney, Agent, or Firm* — Progress Patent Law, PLLC; David R. McKinney

(57) ABSTRACT

A road bearing for inductive coupling to an electrical connection device of an electric vehicle includes a series of primary induction coils, a bearing surface element, and a plurality of deformation features in the bearing surface element. The series of primary induction coils are interconnected to a source of electrical power and disposed in a substantially linear array below a roadway surface and within a roadway structure, and are aligned generally parallel to an alignment of the roadway. The bearing surface element is disposed above the primary induction coils, and has an upper surface that is substantially flush with the roadway surface, has a surface flatness in the range of ±1 μm per 30 mm, and a magnetic permeability in the range of 0.9 to 2. The plurality of deformation features include depressions in the upper surface of the bearing surface element, and are configured to provide friction to vehicle wheels.

20 Claims, 7 Drawing Sheets

(56) References Cited

U.S. PATENT DOCUMENTS

| | | | | |
|---|---|---|---|---|
| 4,304,187 A | * | 12/1981 | Becker | B61B 13/06 |
| | | | | 104/120 |
| 4,836,344 A | * | 6/1989 | Bolger | B60L 5/005 |
| | | | | 191/10 |
| 4,986,604 A | * | 1/1991 | Meister | E01C 23/088 |
| | | | | 299/39.4 |
| 6,651,566 B2 | | 11/2003 | Stephan et al. | |
| 8,365,888 B2 | | 2/2013 | Re Fiorentin et al. | |
| 8,418,824 B2 | | 4/2013 | Aguilar | |
| 2014/0151175 A1 | * | 6/2014 | Vietzke | B60L 5/005 |
| | | | | 191/10 |

* cited by examiner

ROAD BEARING FOR ELECTRIC VEHICLE CONNECTION

CROSS-REFERENCE TO RELATED APPLICATIONS

The present disclosure is related to U.S. Pat. No. 8,556,050, the disclosure of which is incorporated by reference herein in its entirety.

BACKGROUND

Field of the Invention

The present disclosure relates generally to electric vehicles. More particularly, the present disclosure relates to a road bearing that is adapted for high-power inductive power transfer between an electric vehicle and a power source embedded in a roadway.

Related Art

Recent environmental, economic and geopolitical concerns have spurred significant interest and development in electric vehicles, and many advances have been made in electric vehicles in recent years. However, factors such as battery weight, cost, charging time and energy capacity still present significant hurdles to the widespread adoption and use of electric vehicles in place of those powered by internal combustion engines. While battery costs are dropping and energy densities are increasing, the efficiency and affordability of these systems present continuing challenges. Given the current pace of battery development, it is estimated that widespread use of vehicles that employ batteries and other electrical storage devices is not likely to displace the internal combustion engine in the near future, unless heavily subsidized by governments. Even then, the subsidies required would be significant and may be required for a substantial time.

Advances in super-capacitors have been identified as one technology that could be used in place of electrical storage batteries. Indeed, some electric vehicles that are known today include one or more super-capacitors that are integrated with the electrical battery system. High capacity batteries take a long time to charge. Super-capacitors, on the other hand, charge hundreds of times faster. However, capacitor energy density (watt-hours per kilogram) is relatively small when compared to batteries, though it is improving. One researcher has reported production of a super-capacitor with an energy density similar to a lead-acid battery (about 35 watt-hours per kilogram). Another researcher has reported a super-capacitor with an energy density of 64 watt-hours per kilogram, and which can fully charge in 16 seconds and can recharge 10,000 times without significant degradation. In comparison, lithium-ion batteries holds about 200 watt-hours per kilogram. Super-capacitors by themselves do not appear ready to solve the charging time and weight challenges presented by electrical storage batteries for electric vehicles. It is believed that, as they emerge, Electric Vehicles (EVs) will be capable of accepting high power. The method for providing high power to EVs remains a question.

For many years, trolleys and busses have used systems that provide grid power to moving vehicles. Trolley buses and trains can have direct, electrical connection during operation, but it is not believed that private vehicles have been developed that exhibit this attribute. Moreover, electric trolleys and buses typically use continuous overhead catenary wire systems, which create complicated, overhead intersections, are visually distracting, are exposed to environmental hazards, and present significant construction and maintenance costs. These sorts of electrical distribution systems are generally considered impractical for private vehicles, and this and other factors tend to limit this sort of electric grid deployment.

Advantageously, various systems have been conceived for providing a connection between the electric grid and electric vehicles on a roadway without the use of continuous overhead wires. Business and academia around the world are analyzing not only the electrification of vehicles, but also the electrification of roads. One useful development that has been presented is the use of an air bearing for an electrical pickup device, as described in U.S. Pat. No. 8,556,050. This patent describes an electrical pickup device for an electric vehicle that creates an air bearing between the pickup device and an electrical supply line or coils embedded in the roadway. With this type of air bearing connection, air is supplied from the vehicle and cushions the power pickup coils as the electrical pickup device slides over the road. Air bearing induction can provide fast charging using lightweight vehicle coils because it can maintain a very small gap between the electrical supply coil in the road and the power pickup device. Induction without an air bearing tends to involve a relatively large gap between the road and the vehicle coils, which typically results in induction coils that are much heavier.

While air bearings can provide a useful connection between the electric grid and electric vehicles on a roadway, apparatus and methods for providing a suitable connection between the vehicle and the electric grid are needed. For example, an air bearing's air cushion can be very thin, which puts a premium on the flatness and smoothness of a road surface. When the smoothness requirement is met, an air bearing requires relatively little power and can be very quiet. Unfortunately, typical roads do not meet the smoothness requirement for satisfactory air bearing operation.

The present disclosure is directed toward one or more of the above issues.

SUMMARY

It has been recognized that it would be advantageous to provide high-powered electrical transfer between roads and moving vehicles via an air bearing inductive transmission system.

It has also been recognized that it would be advantageous to have a roadway electrical transmission system that is sufficiently smooth for transmission of electrical power to moving electric vehicles via an air bearing inductive transmission device, yet has sufficient traction and durability to form part of a roadway surface for motor vehicles.

In accordance with one embodiment thereof, the present invention provides a road bearing for inductive coupling to an electrical connection device of an electric vehicle. The road bearing includes a series of primary induction coils, a bearing surface element, and a plurality of deformation features in the bearing surface element. The series of primary induction coils are interconnected to a source of electrical power and disposed in a substantially linear array below a roadway surface and within a roadway structure, and are aligned generally parallel to an alignment of the roadway. The bearing surface element is disposed above the primary induction coils, and has an upper surface that is substantially flush with the roadway surface, has a pre-installed flatness of ±1 µm per 30 mm and has a relative magnetic permeability in the range of 0.9 to 2. The plurality of deformation features include depressions in the upper surface of the bearing surface element, and are configured to provide friction to vehicle wheels.

In accordance with another aspect thereof, the invention provides a method for providing a road bearing for providing electrical power to an electric vehicle through inductive coupling. The method includes providing an elongate slot in a pavement structure of a roadway having a travel surface, the slot being generally aligned with a lane of the roadway, disposing a substantially linear series of primary induction coils in the slot and below the travel surface, interconnecting a source of electrical power to the primary induction coils, and placing a bearing surface element above the primary induction coils, with the upper surface substantially flush with the travel surface. The bearing surface element has an upper surface with a surface flatness of ±1 µm per 30 mm and has a relative magnetic permeability in the range of 0.9 to 2.

In accordance with yet another aspect thereof, the invention provides a roadway power transmission system, including a roadway, having a roadway alignment, a roadway structure and a roadway surface, a road bearing, disposed within the roadway structure and aligned generally parallel to the roadway alignment, and a power pickup bearing, extendably attachable to an electric vehicle and configured to be positioned in proximity to the road bearing as the vehicle travels along the roadway. The road bearing includes a series of primary induction coils, disposed in a substantially linear array, interconnected to an electrical power source, and a bearing surface element, disposed above the primary induction coils and having an upper surface that is substantially flush with the roadway surface. The bearing surface element has a surface flatness in the range of ±1 µm per 30 mm and a relative magnetic permeability in the range of 0.9 to 2, and a plurality of deformation features, comprising depressions in the upper surface. The power pickup bearing has at least one secondary induction coil configured to receive electrical power through inductive coupling with the primary induction coils, and a bottom surface having a plurality of air outlets, configured to dispense a flow of air between the bearing surface element and the bottom surface of the power pickup bearing as the vehicle travels along the roadway.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
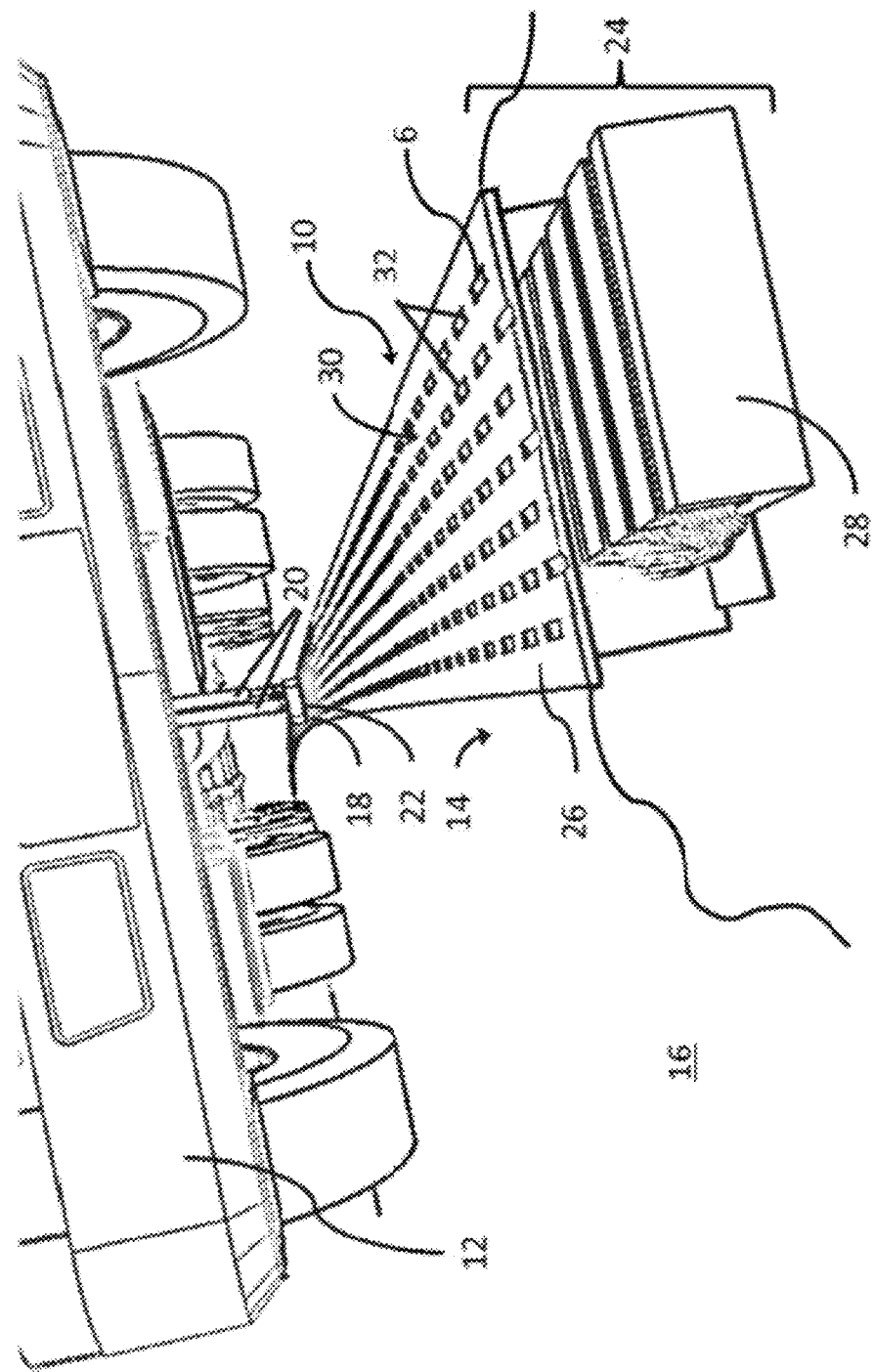
FIG. 1 is a lower perspective view of an electric vehicle having an air bearing electric pickup device in electrical contact with a road bearing device in accordance with the present invention.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, the term "road bearing" has reference to an elongate structure that is positioned within a roadway structure. The road bearing is one of two surfaces, the other being the surface of the vehicle electric pickup device, which together create an air bearing. The road bearing can be aligned with the center of a vehicle travel lane, for example.

As used herein, the term, "road induction coils" has reference to primary inductance coils that are part of the road bearing device in accordance with the present invention. When current passes through the road induction coils, magnetic flux is produced. This magnetic flux induces current in the secondary coils, which are part of the vehicle electric pickup device.

As used herein, the term, "vehicle induction coils" has reference to secondary inductance coils that are part of the vehicle electric pickup device. When current passes through the primary coils in the road bearing device, magnetic flux is produced. This magnetic flux induces current in the vehicle induction coils or secondary coils when the vehicle electric pickup device passes over the road induction coils.

As used herein, the term "vehicle bearing" has reference to the bearing surface portion of the vehicle electric pickup device. The vehicle bearing is configured to be positioned above and generally aligned with the road bearing during motion of the vehicle. An air bearing has two surfaces. The vehicle bearing is one of the two bearing-surfaces required to create and maintain the cushion of air.

As used herein, the term "Intermittent Electric Vehicle" (IEV) means an electric vehicle that includes power storage capacity (e.g. super-capacitor, battery or combination of battery and super-capacitor), and is configured to electrically interconnect to the road induction coils to provide power to the vehicle.

As used herein, the term "tile" has reference to the bearing surface of the road bearing. This geometry of the tile can be a determined using computer-aided-design (CAD) tools for planar and curvilinear surfaces, to allow the tile to lie flush with the adjoining surface of the roadway and also provide a surface that is sufficiently smooth for the air bearing. A tile is designed to conform to the road bearing surface model.

As noted above, it has been recognized that it would be advantageous to provide high-powered electrical transfer between roads and moving vehicles via an inductive transmission system. It has also been recognized that it would be advantageous to have a roadway electrical transmission system that is sufficiently smooth for transmission of electrical power to moving electric vehicles via an air bearing inductive transmission device, yet has sufficient traction and durability to form part of a roadway surface for motor vehicles.

Advantageously, the inventor has developed a road bearing configuration that provides such a device. Moreover, the road bearing device disclosed herein can be provided with smoothness that reduces the need for other devices—such as an air bearing skirt or bladder—to maintain the air bearing, while also providing vehicle traction without impeding the sliding motion of the air bearing. In one embodiment, the road bearing configuration disclosed herein can be fabricated using advanced additive manufacturing techniques—i.e. 3-D printing—providing sufficient smoothness and traction features such as dimples or other deformations that offer vehicle traction without impeding operation of the air bearing.

Provided in FIG. 1 is a perspective view of an embodiment of a road bearing system, indicated generally at 10, in accordance with the present invention. The road bearing system 10 is configured for use with an electric vehicle (EV) 12 that drives upon the driving surface 14 of a roadway 16. While the vehicle 12 shown in FIG. 1 is a large truck, it is to be appreciated that the road bearing system disclosed herein can be used with any type of EV, whether cars, trucks, busses, etc., and these can be pure EV's or hybrid EV's. The EV 12 includes a vehicle air bearing electrical pickup device or vehicle bearing 18 that is attached to the EV 12 via a moveable boom or support 20, and travels very closely above a road bearing, indicated generally at 24, to receive electrical energy through inductive coupling while the vehicle moves.

Figure 4:
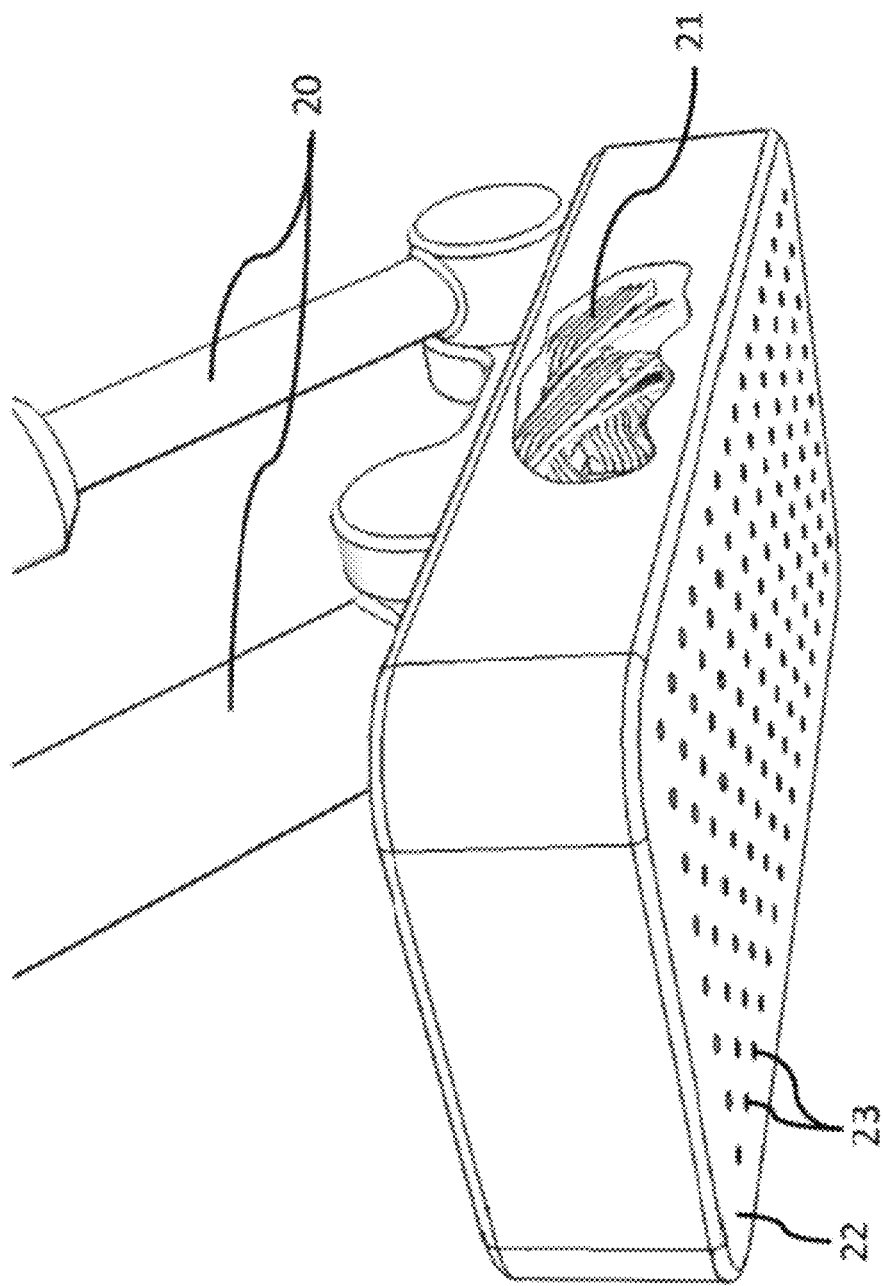
FIG. 4 is a lower perspective view of a vehicle air bearing electrical pickup device configured for use with road bearing device in accordance with the present disclosure.
Figure 5:
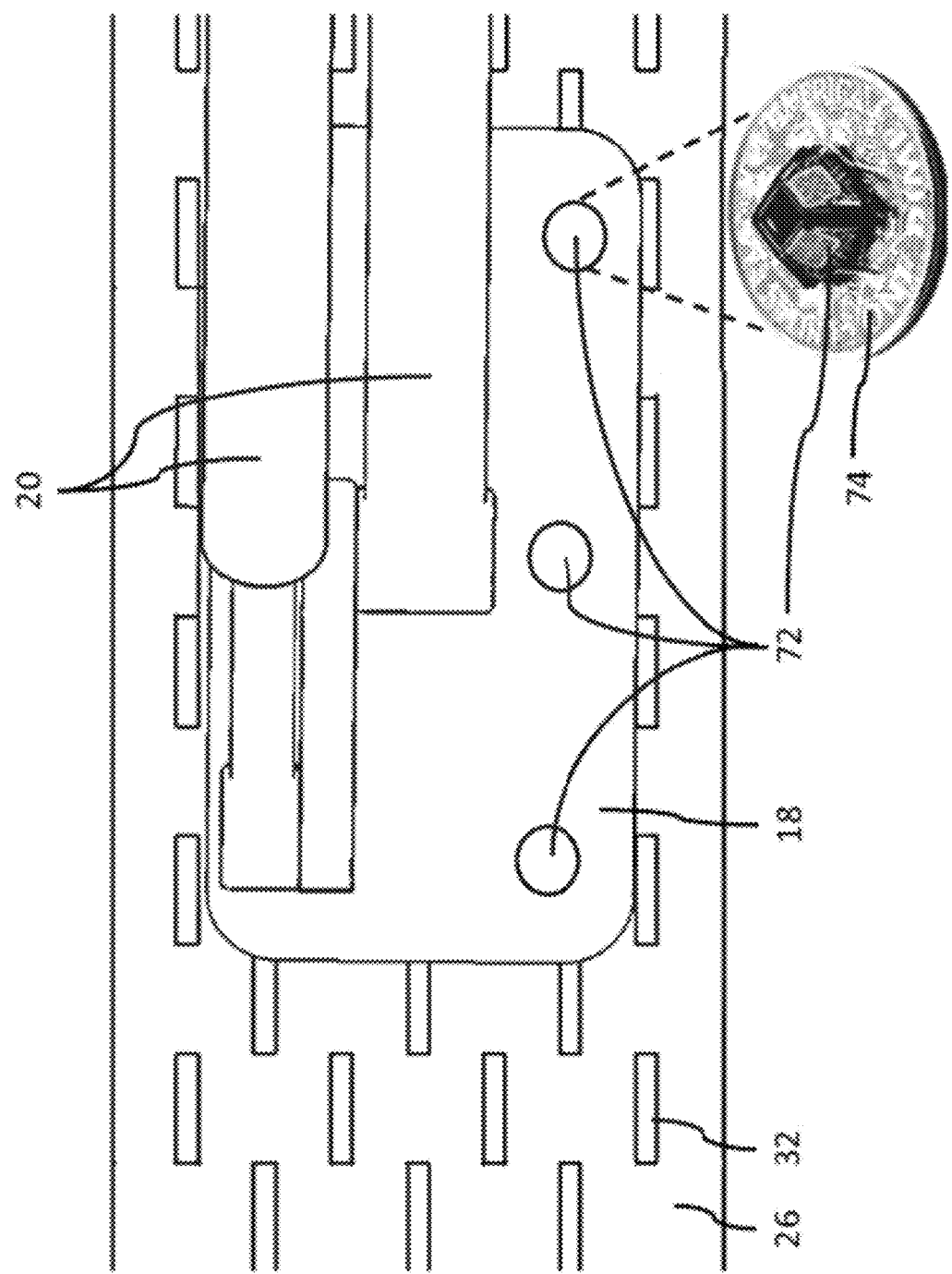
FIG. 5 is a top view of the vehicle air bearing electrical pickup device disposed above the road bearing.

A lower perspective view of a vehicle bearing 18 is provided in FIG. 4, and a top view of a vehicle bearing 18 disposed over the road bearing 24 is shown in FIG. 5. The vehicle bearing 18 can operate and be configured like that shown in U.S. Pat. No. 8,556,050, the details and description of which are incorporated herein by reference. As shown in FIG. 4, the vehicle bearing 18 includes vehicle induction coils 21 within its body, and a lower sliding surface 22 that travels very closely above the road bearing 24, to receive electrical energy through inductive coupling. The bottom surface 22 of the vehicle-bearing also includes a plurality of air jet openings 23 for providing the air bearing, as discussed in more detail below. Deployment, detection and guidance of the vehicle bearing 18 over the road bearing 24 can also be configured as disclosed in U.S. Pat. No. 8,556,050, the disclosure of which is incorporated by reference herein in its entirety.

Figure 2:
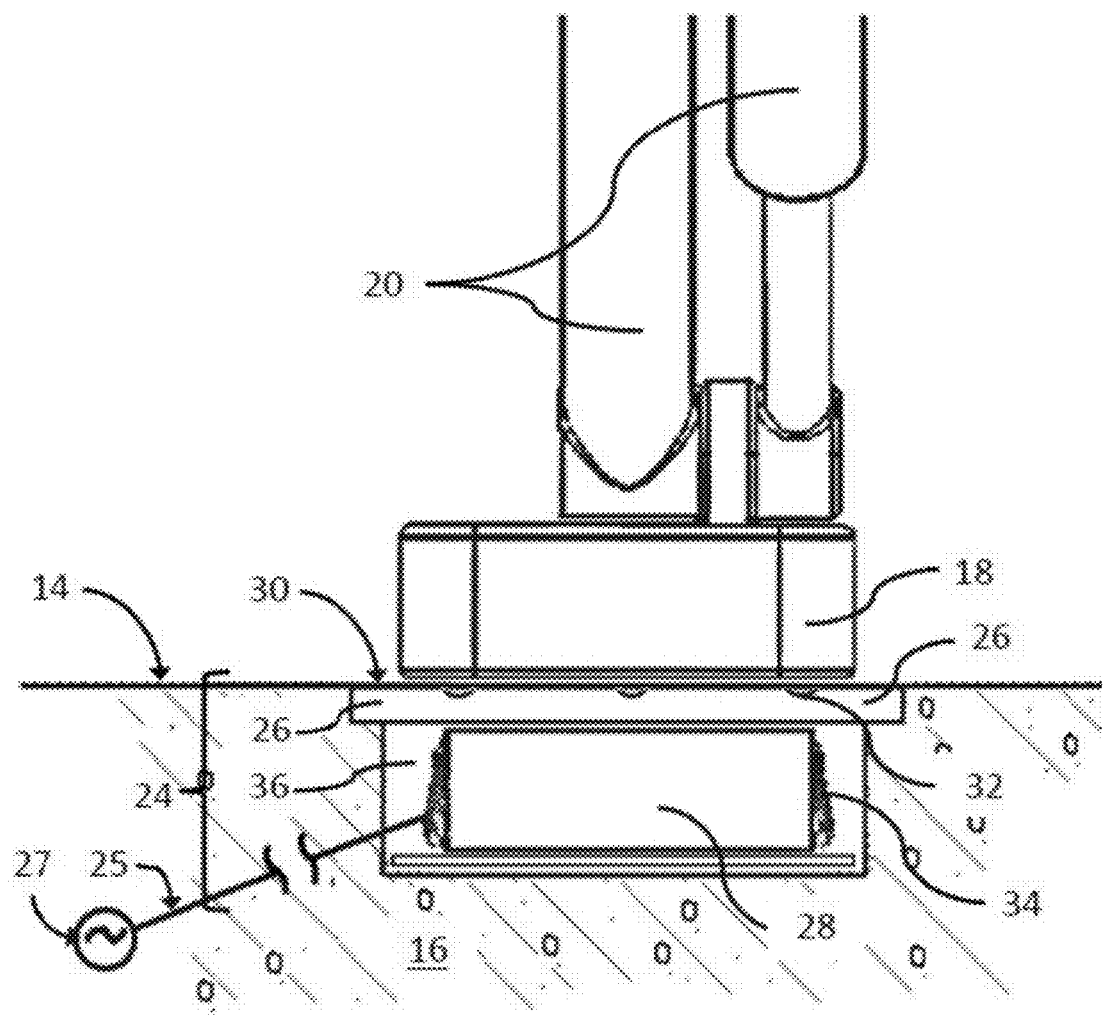
FIG. 2 is a close-up front view of a vehicle air bearing electrical pickup device positioned adjacent to a road bearing device, including induction coils and a bearing surface embedded in a concrete roadway structure, shown in cross-section.

Viewing FIGS. 1 and 2, the road bearing 24 generally includes a road bearing surface element or tile 26 that overlies a generally linear series of primary induction coils 28. The road bearing 24, including the surface element 26 and the primary induction coils 28, is embedded within the structure of the road 16 (e.g. within the pavement), such as generally along the centerline of a travel lane, and electrically connected by a lateral 25 to an electrical power source 27, such as a power line that is buried alongside the roadway 16 and interconnected to the power grid. This feature is also shown in FIG. 2, which depicts a power line 27 buried alongside the road 16, with laterals 25 connecting it to the road bearing 24. As shown in FIG. 1, the road bearing surface element 26 has an upper surface 30 that is configured and positioned to be flush with the upper surface 14 of the roadway 16, and includes a plurality of deformation features 32, such as dimples or depressions, that help provide traction for the vehicle 12 and any other vehicle that travels upon the roadway surface 14.

The upper surface 30 of the road bearing surface element 26 has a pre-installed flatness of ±1 µm per 30 mm. It is also desirable that the road bearing surface element 26 have low magnetic characteristics, such as a relative magnetic permeability of about 1.0, or more generally, in the range of 0.9 to 2.0. Glass, ceramic and concrete typically have magnetic characteristics that are in this range. This value range is selected so that the inductive power transfer will demonstrate good efficiency and experience minimal losses and produce minimal heating of the road bearing surface element 26 and other components of the road bearing device 24. Materials with relative magnetic permeability below 1 are diamagnetic, and materials with relative magnetic permeability above 1 are paramagnetic. While materials having magnetic permeability that is higher than 1.0 can be used, materials having significantly higher relative magnetic permeability will tend to experience more induced currents and heating, which draws energy away from the inductive energy transfer. Paramagnetic materials tend to interrupt or divert magnetic flux, and, depending on their level of permeability, can produce significant heating of the road bearing surface element 26, and corresponding loss of power. While a certain amount this effect can be tolerated and may even be desirable in some situations (such as to allow heating of the road bearing surface element 26 to prevent the buildup of snow and ice), it is desirable to limit this effect. Thus, an upper limit for relative magnetic permeability of about 2 is considered suitable. On the other hand, diamagnetic materials tend to disperse magnetic flux in a way that power transfer efficiency is reduced. It is thus believed that magnetic permeability above 0.9 is desirable to limit this effect. It is thus believed that a road bearing surface element 26 with magnetic permeability in the range of 0.9 to 2 will not substantially interrupt or divert the magnetic flux.

A front sectional view of the road 16 and front view of the vehicle bearing 18 is provided in FIG. 2. In this view it can be seen that the road induction coils 28 of the road bearing 24 are wound upon a core 34 (e.g. of ferromagnetic material), and can be surrounded with an installation filler material 36 that hardens, having structural stiffness and low magnetic characteristics and encases the road induction coils 28. This installation filler material 36 can be a non-conductive cement or other material, such as epoxy, having a relative magnetic permeability of about 1.0, though the permeability of this material can vary based on the same factors discussed above with respect to the magnetic permeability of the road bearing surface element 26. The view of FIG. 2 shows the road bearing 24 positioned in a roadway of concrete construction. In this embodiment, the road induction coils 28 and the bearing surface 26 are disposed in a channel or trench that is formed in the concrete pavement 16, as discussed in more detail below. The top surface 30 of the bearing surface 26 is positioned to be flush with the top surface 14 of the pavement 16.

Figure 3:
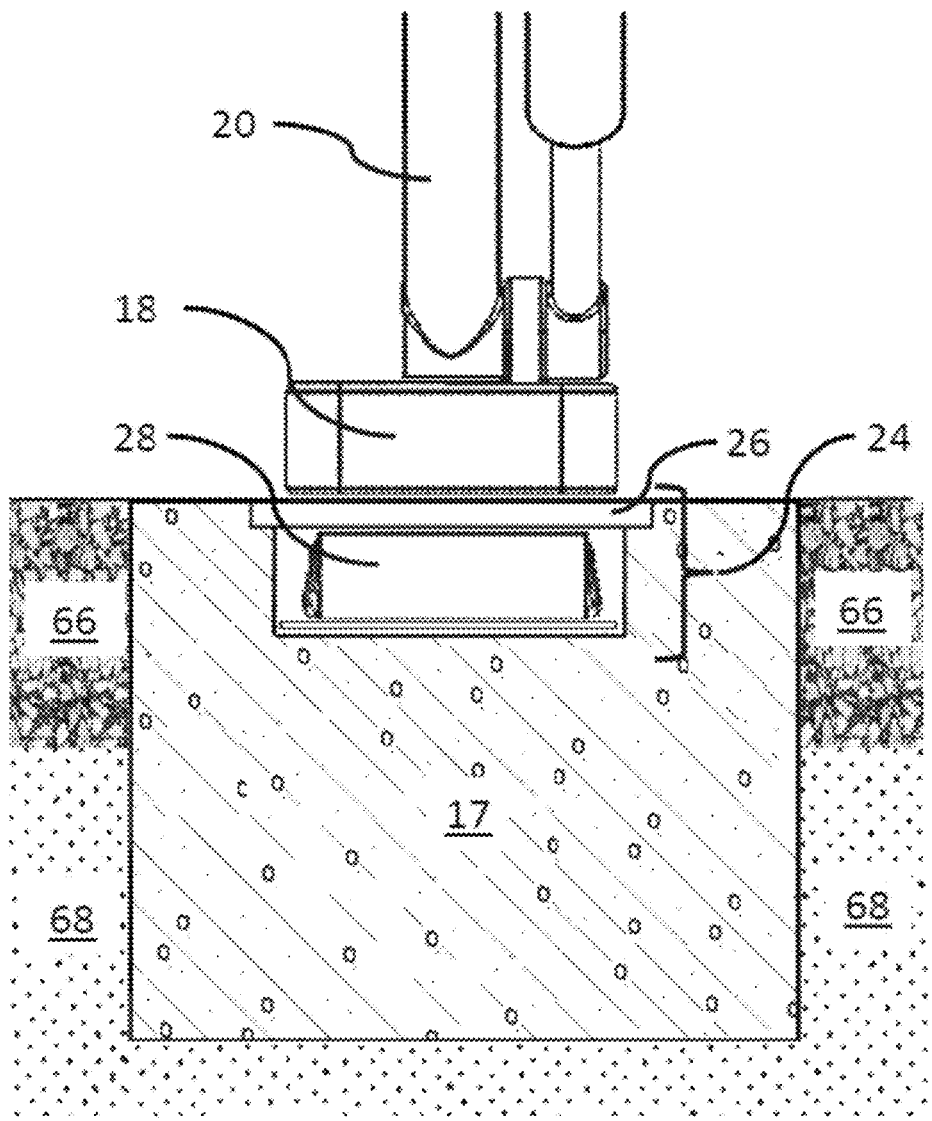
FIG. 3 is a close-up front view of a vehicle air bearing electrical pickup device positioned adjacent to a road bearing device that is embedded in an asphalt roadway structure, shown in cross-section.

Shown in FIG. 3 is a close-up front cross-sectional view of another embodiment of a road bearing device 24 that is embedded in an asphalt roadway structure. In this embodiment the roadway structure comprises at least one layer of asphalt cement 66, which is disposed atop one or more layers of compacted road base material 68, in a manner that is well known. To provide the desired flatness and profile for the roadway surface surrounding the road bearing 24, the road induction coils 28 and the bearing surface 26 are disposed in a channel or trench that is formed in a concrete grade beam 17, which can be positioned in the center of a travel lane. The grade beam 17 can be cast in place upon compacted base material and then the road base 68 and asphalt pavement 66 can be placed around it. Alternatively, the grade beam 17 can be cast in a trench that is cut into the pavement 66 and road base 68 after the road is complete in place, whether it is a newly constructed road or an existing road. The bearing surface 26 is positioned to be flush with the top surface of the grade beam 17, which provides a surface that can be smoother and harder than would be possible with the asphalt pavement 66.

The smoothness and flatness of the upper surface of the installation filler material 36 is not held to the same exacting standards and tolerances in comparison to the upper surface 30 of the road bearing surface element 26 and the sliding surface 22 of the vehicle bearing 18, which together provide the air bearing surfaces.

For planar road bearing tiles 26, basalt fiber reinforced high performance concrete can be used. This material has a relative magnetic permeability of about 1.0. Flatness tolerance on the road bearing tile 26 can be achieved by the use of grinding, then lapping the road bearing tile 26. Dimples can be added by masking the road bearing surface, then sandblasting the dimples into the surface, or by using a laser to form dimples in the surface.

The road bearing surface element or tile 26 can also be produced from a polymer material, such as polyethylene terephthalate (PET) using an additive manufacturing process. This approach can produce the road bearing tile 26 through a build-up process such as Select Laser Sintering (SLS). As a 3-D printing process, SLS can be a manufacturing method for planar and on non-planar road bearing tiles 26. PET has a low relative magnetic permeability (below 1.0), and is a common material for SLS. SLS is advantageous for non-planar road bearing tiles 26, whether the curve and cross slope is within, or exceeds, the air-bearing's flatness tolerance.

When the road bearing is non-planar, and the air gap between the road bearing 24 and the vehicle bearing 18 exceeds the air bearing flatness tolerance, the vehicle bearing 18 can be raised slightly (e.g. 30 mm), to disengage from the air bearing, using a hovering method, which can allow drawing inductive power from the primary coils 28, but the increased gap will reduce the inductive power transfer. This method is referred to herein as non-planar hovering. The same method can be useful for debris avoidance and poor weather conditions.

Non-planar hovering can be implemented using one or more position determining devices 72 on the vehicle bearing 18, as shown In FIG. 5. In one embodiment, the position determining devices 72 can be miniaturized Positioning, Navigation and Timing (PNT) circuits. A group of micro-PNT devices 72 are shown in FIG. 5, disposed atop the vehicle bearing 18. Micro-PNT devices are micro-electromechanical devices that were developed by the Defense Advanced Research Projects Agency (DARPA) and include precise chip-scale gyroscopes, clocks and completely integrated timing and inertial measurement devices all on a single chip. Miniaturization of PNTs will allow the production of highly accurate and relatively inexpensive micro-PNT devices. Micro-PNTs include three orthogonally oriented gyroscopes, three orthogonally oriented accelerometers and a time integration circuit, all disposed on a semiconductor chip that is smaller than a small coin 74, as shown in FIG. 5. The micro-PNT 72 is self-calibrating and offers tremendous size, weight and power improvements over existing sensors.

Those of skill in the art will recognize that other position determining devices, such as MEMs-type gyroscope, accelerometer and time circuit chips that are commercially available, can also be used for this function. If micro-PNTs are not commercially available, any suitable position determining device that provides adequate positional and timing information and is of suitable size can be used.

Adding a PNT 72 or comparable position determining device onto the vehicle bearing 18 can enable rapid transitions of the vehicle bearing 18 between a stowed position, a deployed position relative to the road bearing 24, and hovering above the road bearing 24. A micro-PNT 72 or comparable device can also allow the vehicle bearing to automatically track the location of the road bearing even when not adjacent to it. The road bearing 24 will naturally include location and identification devices (e.g. circuits, transmitters, etc.) that detect the presence of a vehicle bearing 18, identify the associated vehicle, and send a signal to the vehicle/vehicle bearing 18. This sort of system allows electrified roadways to identify vehicles for purposes of charging vehicle owners for electrical power usage, and also allows the vehicle to locate the road bearing. However, in a hover mode, as disclosed herein, when the vehicle bearing 18 is at least partially withdrawn from the road bearing 24, the PNT 72 or other comparable device can accurately track the position of the vehicle bearing in space in real time based on the most recent positional reference. In this way, constant connection to a GPS or road tracking system is not required.

In hover mode, the position determining device 72 (e.g. a PNT) enables the extendable power pickup bearing 18 to "fly" above the b-spline of the road bearing 24 independent of minor vehicle movement from the ideal power transfer path due to road bumps and other vehicle deviations. As used herein, the term "b-spline" has reference to a spline function or combination of spline functions that are used for curve-fitting in computer-aided design and computer graphics. The curvilinear plan shape of a roadway center line and of a road bearing 24 with respect to the roadway centerline can be mathematically constructed as a linear combination of b-splines with a set of control points. When the power pickup bearing 18 is fully extended and the air bearing is engaged, the position determining device 72 also allows the power pickup bearing to track the b-spline defined road bearing 24 independent of minor vehicle movement from the ideal power transfer path due to road bumps and other vehicle deviations.

The road bearing surface element 26 can be a planar tile, or it can be a curvilinear tile. Its size and shape can vary. In one embodiment, the road bearing surface element is 12 mm thick and about 130 mm wide. When the air bearing is functioning, the total gap between the primary coils 28 and secondary coils (21 in FIG. 4) can be less than about 25 mm when the vehicle bearing 18 is positioned adjacent to the road bearing 24, as illustrated in FIGS. 2 and 3. More particularly, the upper surface 30 of the road bearing surface element 26 can be disposed not more than 1 cm above an upper extremity of the primary induction coils 28 during use. The primary ferrite core in the road coils 28 and the secondary ferrite core in the vehicle bearing 18 can be 100 mm wide and 220 mm long. Adding length, more windings, etc. to the secondary coil 21 can increase power transfer. As noted above, the road bearing surface element 26 can be of polyethylene terephthalate (PET), and its top surface 30 can be printed with a hexagonal backing. It is desirable that the top surface 30 of the surface element 26 lie substantially flush with the driving surface 14 of the road 16, such that the vertical difference between the road surface 14 and the top surface 30 of the road bearing surface element 26 is less than one inch. With this configuration, the top surface 30 can provide a smooth and continuous surface for producing the air bearing.

It is desirable that the surface element 26 have low magnetic characteristics, such as a magnetic permeability of about 1.0, or more generally in the range of 0.9 to 2. The surface element 26 also needs to be sufficiently durable to withstand vehicle loads, and abrasion that is likely with roadway materials. The degradation of PET mainly occurs as a result of exposure to UV light and high temperature. PET installations subject to high UV and high temperature are replaceable and UV protected. The advantages of the plurality of nozzle air bearing proven usability for many bearing materials and coatings.

It is also desirable that the road bearing surface element 26 be inert to salt, oil and other substances that are likely to be encountered on a roadway. As discussed above, suitable materials for the road bearing surface element 26 include basalt fiber reinforced high performance concrete and PET. The road bearing surface element 26 can be mass-produced in discrete tile units, then shipped and installed into an existing roadway.

As discussed above, the road bearing surface element 26 can also include deformation features 32, such as dimples, slots or grooves, which help provide traction for vehicles 12 traveling on the roadway 16, while still maintaining the air bearing function. Deformation features 32 that are shaped as elongate semi-circular grooves are also shown in FIGS. 4 and 5. These deformation features 32 comprise grooves or slots—i.e. depressions or essentially "inverted bumps" in the top surface 30 of the surface element 26, so as not to contact the lower sliding surface 22 of the vehicle bearing 18 when it slides above, while providing surface features that enhance traction of vehicle tires upon the top surface 30.

Figure 6:
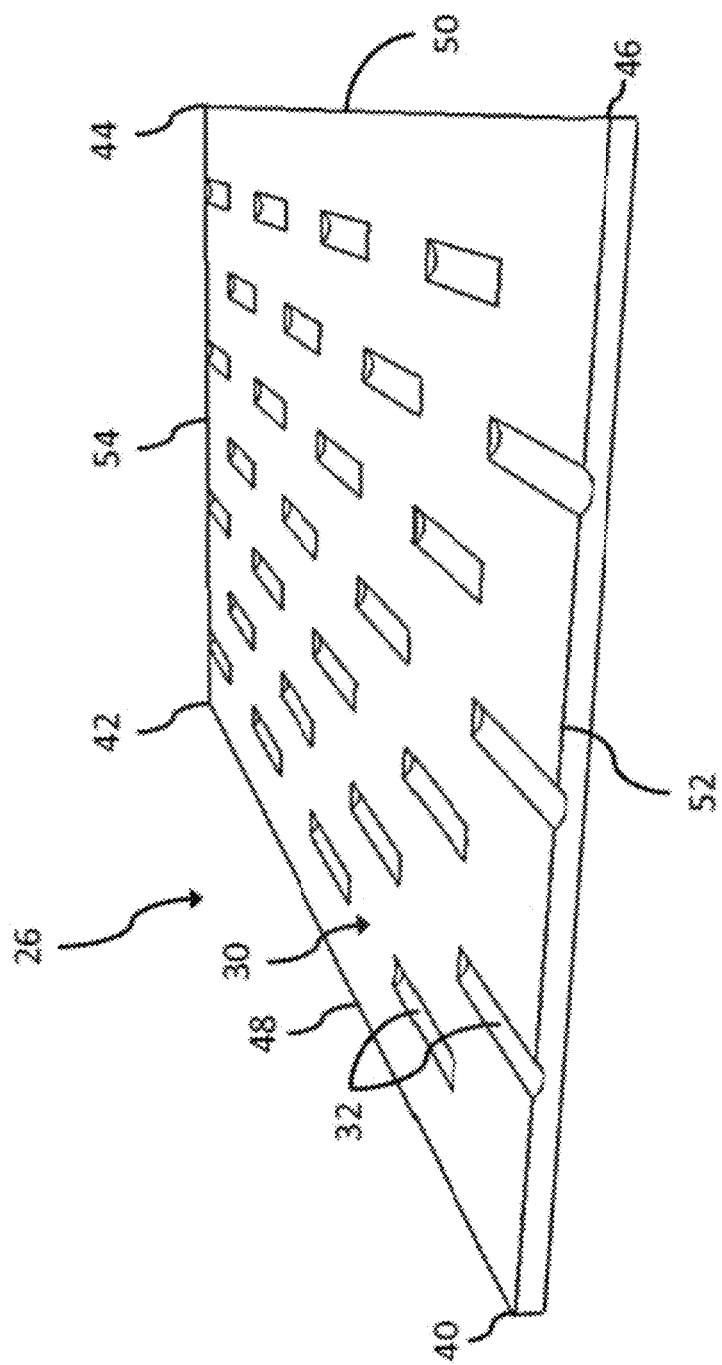
FIG. 6 is a perspective view of the top surface a road-bearing tile in accordance with the present disclosure.

The grooves or slots 32 can be non-continuous, as shown in FIGS. 5 and 6. The depth and shape of these depressions 32 can also vary. In one embodiment the depressions are sandblasted through a mask, into the basalt fiber reinforced high performance concrete material of the road bearing tile 26. The number of deformation features 32 can be increased and their sized decreased if desired. Deformations 32 having a hex, grid or other pattern trap the air from the vehicle bearing 18 within the air bearing gap. Continuous slots or continuous grooves also slow the air sufficiently. Each dimple 32 is a "dead volume" because compressed air will fill the volume and expand as the air bearing passes over. To reduce the loss of air, it is desirable to keep the dimples 32 shallow. Size, shape, depth, and feature density all affect traction. Minimizing dead volume gap while maintaining adequate traction can be achieved with dimples 32 having a depth of 0.5 mm to 1 mm.

Tapering the depth of the dimples 32 is also advantageous. Centerline dimples can be more shallow and dimples can become deeper away from the centerline. It is believed that the air bearing 18 shown in FIGS. 2-4 has a width that is significantly greater than needed, depending on the air pressure and flow rate. It is believed that an air bearing having about half this width should provide adequate air cushion to support the vehicle bearing 18. Tapering of the dimple depth by providing deeper dimples toward the outer edges of the road bearing tile 26 increases traction without significantly affecting air bearing performance. As an alternative to the tapering method, a density method can also be used to increase the dimple density with increased distance from the centerline. For example, a dimple density that increases with distance from the center line can be adopted in which the maximum dimple density is about 30% of the total surface area of the road bearing surface 30.

As shown in FIG. 4, the bottom surface 22 of the vehicle-bearing 18 is a generally planar surface having a plurality of air jet openings 23. These can be laser drilled air jet openings having a diameter from 0.02 mm to 0.06 mm. These micro air jet openings 23 provide air outlets for the flow of air separating the vehicle-bearing surface 22 and the road bearing surface 30 as the vehicle travels thereover, and help limit air loss. The plurality of air outlets 23 ensures an adequate number of air outlets will not be over dimples or other deformation features 32 at any given time, and consequently enhances the cushion of air between the vehicle-bearing surface 22 and the road bearing surface 30.

As noted above, the surface profile of the top surface 30 of the road bearing surface element 26 is a significant factor in the operation of the road bearing device disclosed herein. The shape of the top surface 30 can be planar or curvilinear, as desired to match the profile of the roadway surface. Design and production of the road bearing surface element 26 can be greatly facilitated by the use of computer-aided design techniques and modern manufacturing techniques. Shown in FIG. 5 is a perspective view of a top surface 30 of a tile 26 that has been designed using computer-aided-design tools. The top surface 30 is defined by computer-aided design knots 40, 42, 44 and 46, which define the corners of the top surface 30, and b-splines 48 and 50 that define the side edges (i.e. edges that are generally parallel with the roadway centerline) of a straight or curvilinear tile 26. Since the cross-slope of roadways is generally a straight line, the leading and trailing edges 52, 54 of the tile 26 define straight lines that correspond to the cross slope of the roadway, whether in a straight section or in a superelevated curved section.

The road bearing 24 disclosed herein can be installed in an existing roadway, or built into a new roadway structure, and it can be used in combination with any type of pavement material, such as asphalt pavement or concrete. In accordance with one embodiment, a method for building a road with a road bearing 24 in accordance with the present disclosure can generally include first creating an elongate trench or space in a roadway structure, the trench having sufficient depth and width to accommodate the road bearing. The trench will typically be located near the center of a travel lane of the roadway, and can be cut into an existing roadway structure (e.g. through the pavement layer(s) and base layer(s) therebeneath, depending on the thickness of the layers) or formed in a new roadway structure. In the case of concrete pavement for a new roadway, this can be done by placing or embedding a removable form or blockout structure within the volume where the concrete is to be poured for the roadway, to reserve a space for the road bearing itself. This sort of construction is shown in FIG. 2. Additional form blockouts and/or conduits can be provided in the concrete to allow for electrical connection lines to extend through the concrete to the road bearing. After the concrete is initially cured the blockout material or form can be removed to expose the road bearing trench or space.

The above steps for preparing a concrete roadway to receive a road bearing can be performed in combination with the typical steps associated with concrete road construction, including preparation of the granular sub-base and base materials for the roadway, installation of rebar and forms (if used), screeding and floating of the fresh concrete, and creating concrete joints, such as expansion and crack-control joints. Once the road bearing space is created, whether for an asphalt road or concrete road, the road induction coils 28 are installed in the trench, connected to the power supply 27, and encased in the installation filler material 36. The road bearing surface element 26 is then installed atop the road bearing filler material 36, and then sealed.

In the case of asphalt pavement, as shown and discussed above with respect to FIG. 3, a grade beam 17 can be cast in place upon compacted base material and then the road base 68 and asphalt pavement 66 can be placed and compacted around it. Alternatively, the grade beam 17 can be cast in a trench that is cut into the pavement 66 and road base 68 after the road is complete in place, whether it is a newly-constructed road or an existing road.

The steps outlined above allow the installation of a road bearing in a roadway lane with the appropriate smoothness for the air bearing system, while also providing a surface that has traction features. Shown in FIG. 6 is a perspective view of an electric vehicle 12 on a section of road 16 having a road bearing 24. In the straight portion 60 of the road 16 the top surface 30 of the road bearing tile 26 is generally planar and is flush with the surrounding surface of the roadway. Given the usual drainage cross-slope of the road, this top surface 30 will have a slightly transverse slope, and will have a longitudinal slope that depends on the grade of the roadway 16 in that given location. In a curved portion 62 of the road, the top surface 30 of the road bearing tile 26 can have an overall curvilinear shape (i.e. in plan view) that follows the curvature of the road, with a transverse cross-slope that depends on the superelevation of the roadway at the given location. So long as the curvature of the road bearing 24 has a relatively large radius—e.g. such that the length of the vehicle bearing 18 (shown in FIGS. 3, 4) will remain entirely over the top surface 30 of the road bearing 24 while passing over—the air cushion can remain effective.

Figure 7:
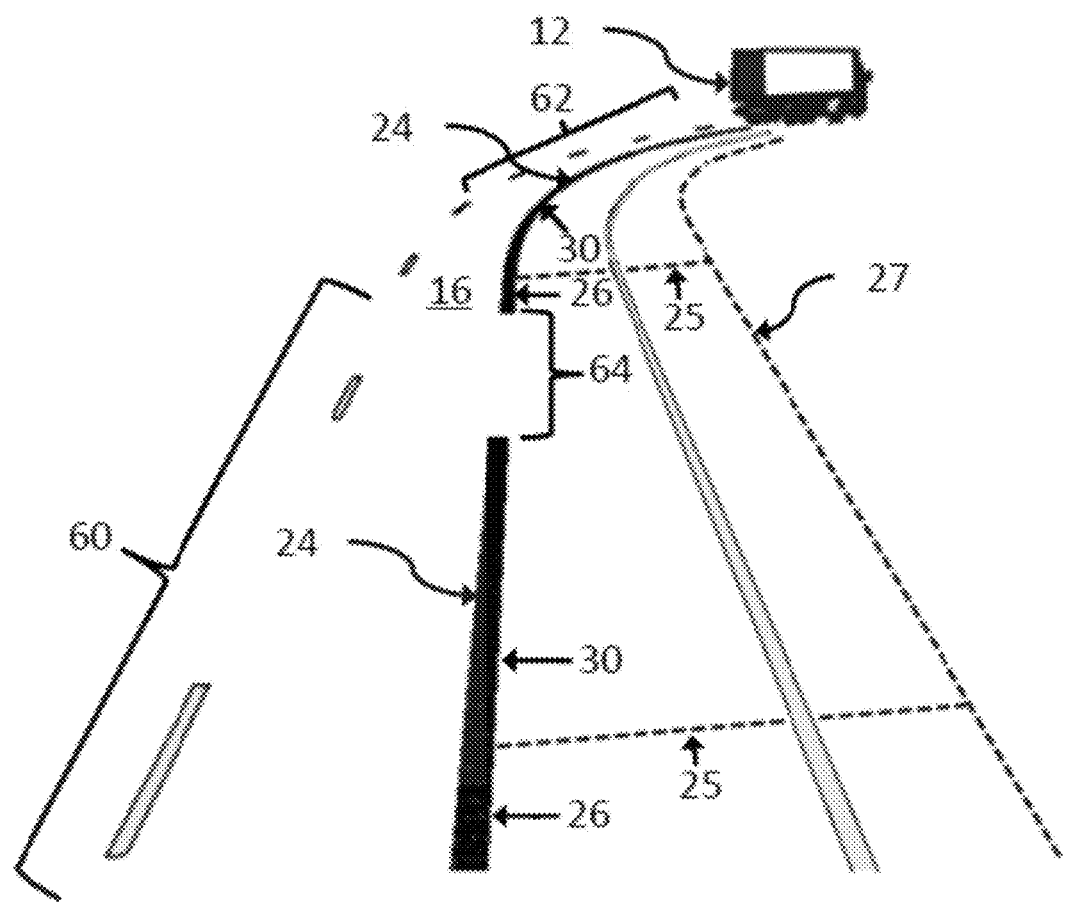
FIG. 7 is a perspective view of section of roadway that is provided with a road bearing device in accordance with the present invention, embedded within the roadway surface along the center of a vehicle travel lane

Advantageously, the road bearing configuration disclosed herein can be intermittent along roadways, in addition to being continuous. As shown in FIG. 7, the road bearing 24 can have a gap 64 between successive portions. The size of the gap 64 shown in FIG. 7 is intended to be representative only. Actual gaps between successive portions of a road bearing 24 can be any distance—whether a few feet or many miles. The EV can use electrical power directly while over the road bearing 24, and also recharge its super-capacitors and\or batteries while in those regions. However, when traveling on road sections that do not have a power transfer road bearing 24, the vehicle bearing 18 can be retracted (i.e. lifted up into the vehicle undercarriage by the boom 20), and the vehicle 12 can operate using its battery power alone. The EV thus becomes an IEV. In addition to the vehicle bearing 18 and road bearing 24 shown herein, it is believed that additional IEV connection devices and configurations will also emerge in the near future, especially for the intermittent needs of public EVs and private EVs.

Recent improvements in super-capacitors, mentioned above, hold out promise for integration with electrical vehicles, and can potentially allow recharging of EV batteries with intermittent connection to the electrical grid. For example, where an EV has a battery capacity of 500 watt-hours, it can also carry one or more super-capacitors with a comparable capacity. The super-capacitors can recharge very quickly, while the vehicle is electrically connected to a road bearing, and then slowly recharge the vehicle battery when the vehicle is not connected to a road bearing. At the present time, the super-capacitor-per-battery ratio is relatively low, since super-capacitors do not generally have the same energy density of batteries. However, improvements in super-capacitor energy density and cost should improve the likelihood of increasing the super-capacitor-per-battery ratio, which can help provide rapid EV charging when vehicles pass over inductance coils. With a super-capacitor-per-battery ratio of 0.25, four short charges could potentially charge the battery. If the spacing between the road-bearings is far enough apart, the super-capacitors can have enough time to charge a slower-charging battery between electrical interconnection with the road bearings. Intermittent, power boosting can further reduce the need for large EV batteries, and extend EV range. With properly spaced road bearing installations, infinite range is possible.

As the super-capacitor-per-battery ratio increases, wireless power induction can deliver more power to passing vehicles, and relatively few installations can distribute large amounts of energy to many vehicles. In contrast to batteries, super-capacitors quickly charge with high-power transfer. There are claims emerging that super-capacitors can fully charge in just 16 seconds. With this capability, a 200 kW-Wireless IEV could fully recharge on a quarter-mile segment of road bearing 24 when traveling at around 60 mph. Multiple vehicles could simultaneously charge at high-power on the same segment, especially in high-density locations. Heavy vehicles could have multiple high-power pickups that scale from 200 kW, to 400 kW, 600 kW, and so on, on the same segment. The use of many wireless IEVs in this way could substantially reduce oil consumption and vehicle emissions. Additionally, the fast charging of wireless EVs in this way would eliminate the need to stop at charging stations, and can potentially be implemented without major strain on the existing electrical distribution grid or require major upgrades to grid systems.

The air bearing inductance system disclosed herein is advantageous for many types of vehicles, including high-powered systems (e.g. 200 kW) in part because inductance coils separated by an air bearing can have very close proximity between the primary (road) coils and the secondary (vehicle) coils. As the gap narrows between the road coils and vehicle coils, the power transfer for a given coil size goes up, or in other words, the size of coil for a given power transfer goes down. This can provide a significant reduction in coil diameter and weight. The use of computer-aided-design and additive fabrication or 3-D printing methods can further enable the production of road bearing tiles that help provide an economical, high-tolerance air bearing system for facilitating electric vehicles. Inductance also reduces electrocution risk because contact alone, such as walking on the road bearing, does not ground the circuit. Coils or ferromagnetic material must be present to pickup the wireless power. With the air bearing wireless power variant, close proximity of the primary and secondary coils also reduces electromagnetic radiation, which can heat metal debris. Most debris will normally be swept away from the air bearing by the flow of compressed air with each vehicle passage. Impact of small particles with the vehicle bearing 18 will also tend to push debris away.

It is to be understood that the above-referenced arrangements are only illustrative of the application of the principles of the present invention in one or more particular applications. Numerous modifications and alternative arrangements in form, usage and details of implementation can be devised without the exercise of inventive faculty, and without departing from the principles, concepts, and scope of the invention as disclosed herein. Accordingly, it is not intended that the invention be limited, except as by the claims.

What is claimed is:

1. A road bearing for inductive coupling to an electrical connection device of an electric vehicle, comprising:

a series of primary induction coils, interconnected to a source of electrical power, disposed in a substantially linear array below a roadway surface and within a roadway structure and aligned generally parallel to an alignment of the roadway;

a bearing surface element, disposed above the primary induction coils, having an upper surface that is substantially flush with the roadway surface and has a surface flatness in the range of ±1 µm per 30 mm, and a relative magnetic permeability in the range of 0.9 to 2; and a plurality of deformation features, comprising depressions having a depth of no more than 1 mm in the upper surface of the bearing surface element.

2. A road bearing in accordance with claim 1, wherein the bearing surface element is of a material selected from the group consisting of fiber reinforced concrete and polyethylene terephthalate (PET).

3. A road bearing in accordance with claim 1, wherein the bearing surface element is about 20 cm wide, about 12 mm thick, and the upper surface is disposed not more than 1 cm above an upper extremity of the primary induction coils.

4. A road bearing in accordance with claim 1, wherein the bearing surface element comprises a linear series of discrete tile elements, each tile element individually placed above the series of primary induction coils.

5. A road bearing in accordance with claim 1, wherein the primary induction coils and the bearing surface element are disposed generally along a center of a roadway lane.

6. A road bearing in accordance with claim 1, wherein the bearing surface element has a curvilinear upper surface, corresponding to at least one of a curvature of the roadway structure and a superelevation of the roadway structure.

7. A road bearing in accordance with claim 1, wherein the deformation features are selected from the group consisting of dimples, non-continuous longitudinal grooves and non-continuous longitudinal slots.

8. A road bearing in accordance with claim 7, wherein the deformation features have a minimum depth in a centerline region of the bearing surface element, and have a maximum depth toward side edges of the bearing surface element.

9. A road bearing in accordance with claim 7, wherein the deformation features have a depth of 0.5 mm to 1 mm, a minimum density in a centerline region of the bearing surface element, and a maximum density of 30% of an area of the bearing surface element toward side edges of the bearing surface element.

10. A road bearing in accordance with claim 1, further comprising a filler material, surrounding the primary induction coils and underlying the bearing surface element, the installation filler material comprising non-conductive cement with a relative magnetic permeability of about 1.0.

11. A road bearing in accordance with claim 1, wherein the primary induction coils are configured to transmit, via inductive coupling, electrical power to a pickup device passing above the bearing surface element with an air gap of not more than 30 mm between the bearing surface and the power pickup device.

12. A method for providing a road bearing for providing electrical power to an electric vehicle through inductive coupling, comprising:

providing a substantially linear series of primary induction coils below a travel surface of a pavement structure of a roadway, the linear series of primary induction coils being generally aligned with a lane of the roadway;

interconnecting a source of electrical power to the primary induction coils; and placing a bearing surface element, having a relative magnetic permeability in the range of 0.9 to 2, above the primary induction coils, the bearing surface element having an upper surface that is substantially flush with the travel surface, the upper surface having a plurality of depressions, each depression having a depth of not more than 1 mm.

13. A method in accordance with claim 12, wherein placing the bearing surface element comprises placing a linear series of discrete tile elements above the series of primary induction coils.

14. A method in accordance with claim 12, wherein the plurality of depressions have a minimum depth in a centerline region of the bearing surface element, and have a maximum depth toward side edges of the bearing surface element.

15. A method in accordance with claim 12, further comprising providing a filler material around the primary induction coils and underlying the bearing surface element, the filler material comprising non-conductive cement with a relative magnetic permeability of about 1.0.

16. A method in accordance with claim 12, further comprising disposing the substantially linear series of primary induction coils in a channel in a grade beam, disposed within the pavement structure.

17. A method in accordance with claim 16, wherein the grade beam is disposed within a trench cut in the pavement structure.

18. A road bearing configured for inductive coupling to an electrical connection device of a moving electric vehicle on a roadway surface, comprising:

a series of primary induction coils, interconnected to a source of electrical power, disposed in a substantially linear array below the roadway surface;

a bearing surface element, disposed above the primary induction coils, having an upper surface that is substantially flush with the roadway surface and a relative magnetic permeability that is above about 0.9; and a plurality of deformation features, comprising depressions in the upper surface of the bearing surface element, the depressions having a depth of no more than 1 mm.

19. A road bearing in accordance with claim 18, wherein the upper surface of the bearing surface element is disposed not more than 1 cm above an upper extremity of the primary induction coils.

20. A method in accordance with claim 18, wherein the deformation features are selected from the group consisting of dimples, non-continuous longitudinal grooves and non-continuous longitudinal slots.

* * * * *